US012573828B2

(12) United States Patent
Anderson et al.

(10) Patent No.: US 12,573,828 B2
(45) Date of Patent: Mar. 10, 2026

(54) WIRE STUB OUT CLIP

(71) Applicant: ERICO International Corporation, Solon, OH (US)

(72) Inventors: Scott Ernest Anderson, Garrettsville, OH (US); James Anthony Bukowski, Akron, OH (US)

(73) Assignee: ERICO International Corporation, Solon, OH (US)

( * ) Notice: Subject to any disclaimer, the term of this patent is extended or adjusted under 35 U.S.C. 154(b) by 19 days.

(21) Appl. No.: 18/821,514

(22) Filed: Aug. 30, 2024

(65) Prior Publication Data

US 2025/0079817 A1     Mar. 6, 2025

Related U.S. Application Data

(60) Provisional application No. 63/580,199, filed on Sep. 1, 2023.

(51) Int. Cl.
H02G 3/32          (2006.01)
(52) U.S. Cl.
CPC ..................................... H02G 3/32 (2013.01)
(58) Field of Classification Search
CPC ................................ H02G 3/32; F16M 13/02
USPC ....................................................... 248/74.1
See application file for complete search history.

(56) References Cited

U.S. PATENT DOCUMENTS

| | | | |
|---|---|---|---|
| 1,782,791 A | 11/1930 | Nielsen | |
| 3,021,103 A * | 2/1962 | Beyerle | F16L 5/00 |
| | | | 248/57 |

| | | | |
|---|---|---|---|
| 6,402,096 B1 | 6/2002 | Ismert et al. | |
| 6,467,734 B1 * | 10/2002 | Brown | F16L 3/1226 |
| | | | 248/65 |
| 7,060,899 B1 | 6/2006 | Hoefer | |
| 8,141,831 B2 * | 3/2012 | Julian | F16L 43/02 |
| | | | 248/65 |
| 8,403,277 B2 | 3/2013 | Nuernberger et al. | |
| 8,622,092 B1 | 1/2014 | Condon et al. | |
| 9,022,326 B2 * | 5/2015 | Brown | F16L 3/08 |
| | | | 248/65 |
| 9,822,926 B2 | 11/2017 | Nikayin et al. | |
| 9,929,549 B2 | 3/2018 | Witherbee et al. | |
| 10,361,547 B2 | 7/2019 | Kellerman | |
| 10,411,451 B2 | 9/2019 | Momin et al. | |

(Continued)

FOREIGN PATENT DOCUMENTS

| | | |
|---|---|---|
| DE | 1024604 B | 2/1958 |
| DE | 8703304 U1 | 6/1987 |

(Continued)

*Primary Examiner* — Todd M Epps
(74) *Attorney, Agent, or Firm* — Quarles & Brady LLP

(57) ABSTRACT

A support assembly for in-wall wiring can include a support bracket that extends between building structures. The clip can include clip arms and an internal funnel that has a front opening and a rear opening that is larger than the front opening. The clip arms can be securable to the support bracket to support the clip to receive wire through the internal funnel from the rear opening to the front opening, with the clip in either of a rear-side orientation and a front-side orientation, selectively. In the rear-side orientation, the clip arms can secure the clip on a rear side of the support bracket and in the front-side orientation, the clip arms can secure the clip on a front side of the support bracket.

20 Claims, 6 Drawing Sheets

(56)      References Cited

U.S. PATENT DOCUMENTS

| | | | |
|---|---|---|---|
| 10,914,404 B2 | 2/2021 | Thuston et al. | |
| 10,965,071 B1 | 3/2021 | Johnson et al. | |
| 11,047,510 B2 | 6/2021 | Juzak et al. | |
| 11,349,289 B2 * | 5/2022 | Anderson | H02G 3/20 |
| 2009/0134283 A1 | 5/2009 | Schulz et al. | |
| 2013/0104494 A1 * | 5/2013 | Evangelista | F16B 7/0473 |
| | | | 403/291 |
| 2016/0126711 A1 | 5/2016 | Colangelo et al. | |

FOREIGN PATENT DOCUMENTS

| | | |
|---|---|---|
| DE | 3527914 C2 | 6/1991 |
| KR | 10-2277038 B1 | 7/2021 |
| WO | 00/49443 A1 | 8/2000 |

* cited by examiner

WIRE STUB OUT CLIP

CROSS-REFERENCE TO RELATED APPLICATIONS

This application claims priority to and incorporates by reference U.S. Provisional Application No. 63/580,199, filed Sep. 1, 2023, titled "WIRE STUB OUT CLIP".

BACKGROUND

In construction of a building, electrical work can be performed prior to installation of the drywall. For example, electrical wiring and electrical boxes can be installed for wall outlets, switches, and light fixtures.

SUMMARY

Some embodiments of the invention provide a clip to secure wiring to a support bracket. The clip can include a body, first clip arms, and second clip arms. The body can define an internal funnel that extends between a rear side with a rear opening and a front side with a front opening. The rear opening can be wider than the front opening. The first clip arms can extend in a frontward direction and can be configured to engage the support bracket to secure the clip at a first side of the support bracket. The second clip arms can extend in a rearward direction and can be configured to engage the support bracket to secure the clip at a second side of the support bracket.

In some examples, a support assembly for in-wall wiring can include a support bracket, and a clip. The support bracket can extend between studs or other building structures. The clip can include an internal funnel, first clip arms, and second clip arms. The clip can define a front opening at a front side and a rear opening at a rear side. The rear opening can be larger than the front opening. The first clip arms can extend a frontward direction and second clip arms can extend in a rearward direction. The clip can be secured to the support bracket to receive wire through the internal funnel. The clip can be in either a rear-side orientation or a front-side orientation. In the rear-side orientation, the first clip arms can be secured within a rear channel of the support bracket and the internal funnel can extend past the support bracket in the frontward direction, so that the front opening is located at a first distance from the front of the support bracket. In the front-side orientation, the second clip arms can be secured around the support bracket and the internal funnel can extend from the support bracket in the frontward direction, so that the front opening is located at a second distance from the front of the support bracket that is larger than the first distance.

In some examples, a method of installing wiring on a support bracket can include securing the support bracket to extend between studs or other building structures. A clip can be selectively secured to the support bracket in a rear-side orientation or a front-side orientation. In the rear-side orientation, first clip arms of the clip can be secured within a rear channel of the support bracket and an internal funnel of the clip can extend past the support bracket in a frontward direction, so that a front opening of the internal funnel is located frontward of the support bracket. In the front-side orientation, second clip arms of the clip can be secured around the support bracket and the internal funnel can extend from the support bracket in the frontward direction, so that the front opening of the internal funnel is located frontward of the support bracket. Prior to installation of drywall over the support bracket and clip, one or more wires can be extended through the internal funnel, from a rear opening to the front opening, to secure the one or more wires to the support bracket.

In some examples, a clip to secure wiring to a support bracket can include a funnel body, support arms, first clip arms, and second clip arms. The funnel body can define an internal funnel and can include a rear end and a front end that is narrower than the rear end. The support arms can extend integrally from the rear end of the funnel body in a frontward direction. The first clip arms can extend integrally in opposing directions from the support arms, transverse to the frontward direction. The second clip arms can extend integrally from the rear end of the funnel body in a rearward direction. The sets of the first clip arms can be resiliently deformable toward each other for installation into a rear channel of the support bracket and the sets of the second clip arms being resiliently deformable to snap around top and bottom sides of the support bracket.

In some examples, a support assembly for in-wall wiring can include a support bracket and a clip. The support bracket can extend between building structures. The clip can include an internal funnel with a front opening and a rear opening. The rear opening can be larger than the front opening. The clip arms can be secured to the support bracket to support the clip to receive wire through the internal funnel from the rear opening to the front opening. The clip can be in selectively either of a rear-side orientation or a front-side orientation. In the rear-side orientation, the clip arms can secure the clip on a rear side of the support bracket with the internal funnel extending to support the front opening forward of the support bracket or in the front-side orientation, the clip arms can secure the clip on a front side of the support bracket with the internal funnel extending from the support bracket in the frontward direction to the front opening.

In some examples, a clip to secure wiring to a support bracket can include a body, first clip arms, and second clip arms. The body can define an internal funnel extending between a rear opening at a rear side of the body and a front opening at a front side of the body. The rear opening can be wider than the front opening. The first clip arms can extend in a frontward direction and configured to engage the support bracket to secure the clip at a first side of the support bracket. The second clip arms can extend in a rearward direction and configured to engage the support bracket to secure the clip at a second side of the support bracket.

In some examples, a method of installing wiring on a support bracket can include securing the support bracket to extend between studs or other building structures. A clip can be selectively secured to the support bracket in either of a rear-side orientation or a front-side orientation. In the rear-side orientation, an internal funnel of the clip can extend from a rear opening behind the support bracket, past the support bracket in a frontward direction, so that a front opening of the internal funnel that is smaller than the rear opening is located frontward of the support bracket. In the front-side orientation, the internal funnel can extend forward of the support bracket in the frontward direction, from the rear opening to the front opening. Prior to installation of drywall over the support bracket and clip, one or more wires can be extended through the internal funnel, from a rear opening to the front opening, to support the one or more wires with the support bracket.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
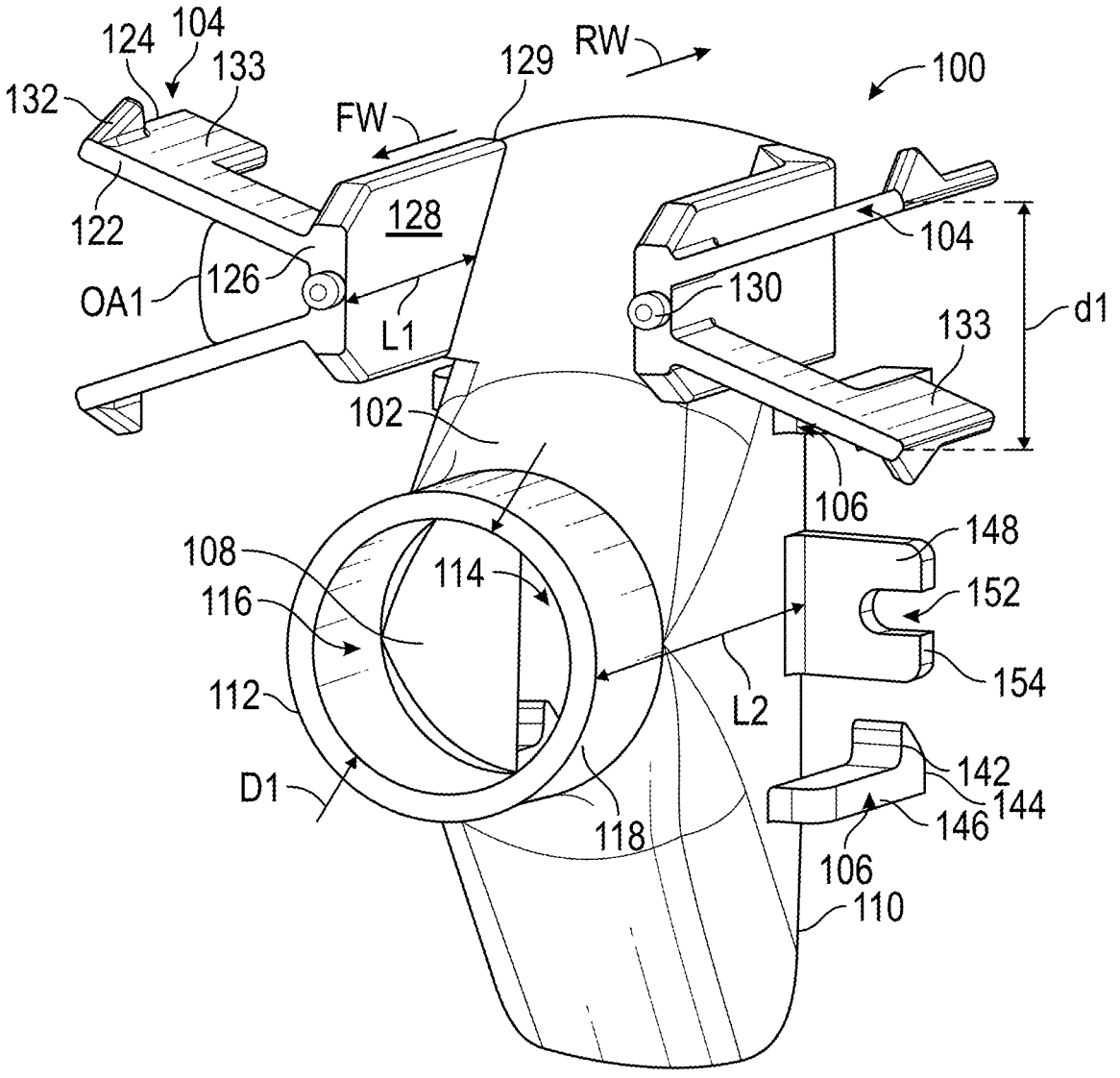
FIG. 1 is a front, right perspective view of a clip according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to perform electrical work prior to the installation of the drywall. According to a blueprint or other requirement document (e.g., local electrical code), an electrician needs to install electrical wiring and electrical boxes for wall outlets, switches and light fixtures at specific locations between wall studs and other framing of a building. In some instances, once the electrical work is conducted, the electrical wirings may stick out from the specified locations. After the electrical works is performed, the wall studs and framing of the building is covered by a drywall. Accordingly, the previously installed wires may be hidden from view, requiring workers to later cut openings in the drywall to complete the electrical installation. This process may be inefficient and error-prone. Further, although drywall may instead be pre-cut to provide openings for wiring, insecure attachment of wires to behind-wall structures may lead to misalignment of the pre-cut holes and the relevant wires.

Embodiments of the invention can be useful to address these issues, and others. For example, embodiments of the invention may include a clip to securing wiring at a desired position in the wall. In some cases, such a clip can both secure wiring and provide positive engagement with drywall to guide installers in locating cuts through the drywall, whether before or after drywall installation. In some embodiments, the clip can be used in conjunction with a support bracket between wall studs or framing, or in various other ways.

In particular, some examples can include a clip formed with one or more clip arms extending from a body. The clip arms can be snapped to a support bracket with the clip in different orientations (e.g., using different sets of the clip arms) in order to anchor the body of the clip to building structures and provide appropriate spacing and proximity relative to the drywall and relevant studs. For example, a first set of arms can be configured to secure a clip to a bracket with a first spacing relative to overlaying drywall and a second set of arms can be configured to secure the clip to the bracket with a second spacing relative to overlaying drywall.

In some cases, a clip body may include openings that enable one or more wires to extend through the body, to assist in locating the wires for further operations as well as securing the one or more wires to the support bracket. For example, a body may define an internal funnel that tapers (e.g., continuously) between a larger rear opening and a smaller front opening. Accordingly, wires can be easily fed into the rear opening over a wide area (e.g., selectively from above or below a support structure that supports the clip) and then guided by the walls of the internal funnel to a more localized (e.g., installation) location at the front opening.

Figure 2:
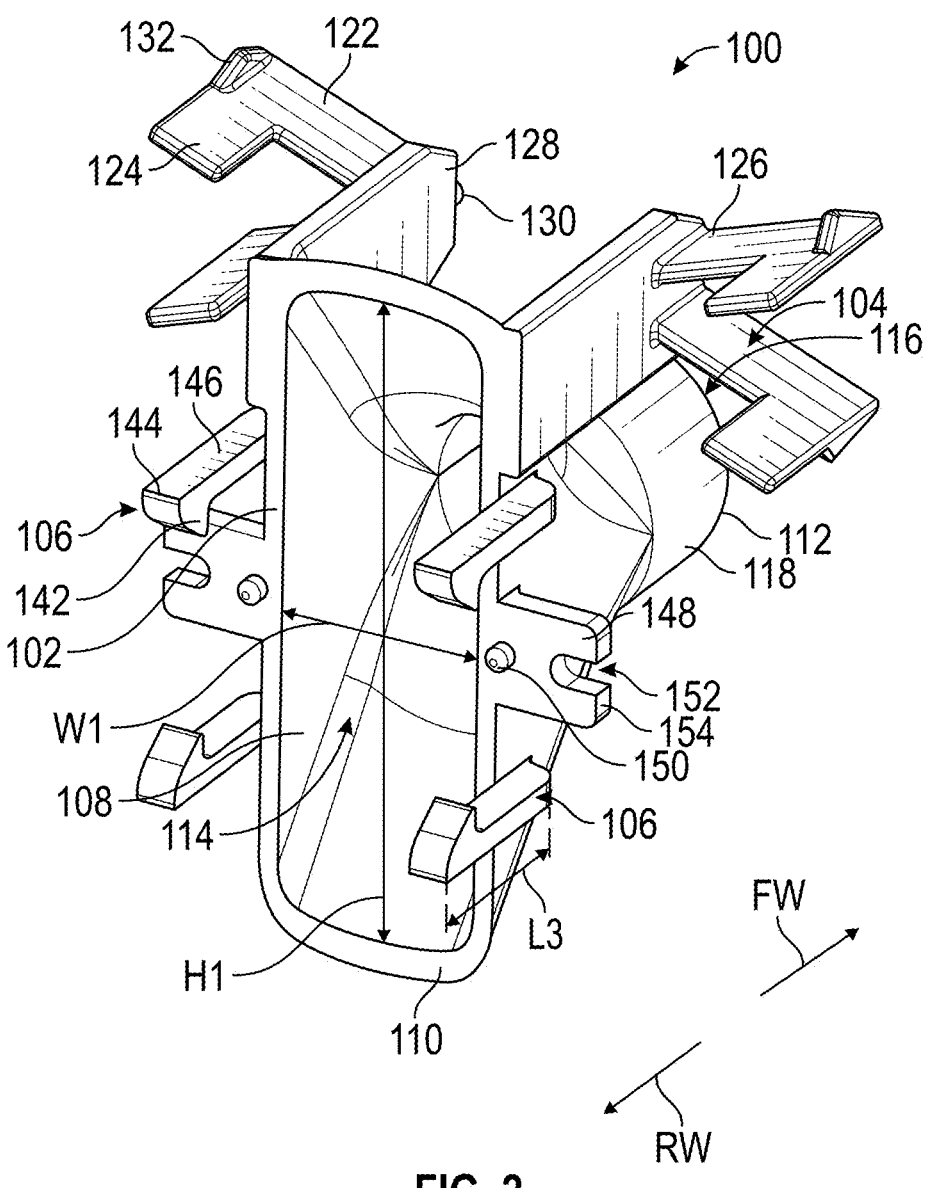
FIG. 2 is a rear, left axonometric view of the clip of FIG. 1.

FIGS. 1 and 2 illustrate an example configuration of a clip 100. Referring to FIG. 1, the clip 100 includes a body 102, first clip arms 104, and second clip arms 106 (e.g., integrally molded or otherwise integrally formed, as shown). In the illustrated example, the body 102 tapers from wider to narrower from a perspective moving from back to front, and the body 102 correspondingly defines an internal funnel 108 that extends between a rear side 110 of the body 102 and a front side 112 of the body 102. In some examples, the shape of the body 102 can be a frustum (e.g., shell or tubular frustum) although various other configurations are also possible. Generally, the internal funnel 108 can provide a smooth surface configured to guide the wires through the body 102 without any sharp edges that may damage the insulative covers of the wires or catch points to impede passage of the wires.

The rear side 110 of the body 102 includes a rear opening 114 and the front side 112 of the body 102 includes a front opening 116. The rear opening 114 defines one end of the internal funnel 108 and the front opening 116 defines the other end of the internal funnel 108, with the rear opening 114 and the front opening 116 in communication to allow an object (e.g., electrical wires, conduits) through the body 102. In some examples, the body 102 may include an elongated duct 118 that may include the front opening 116. As detailed below, the elongated duct 118 or other structure around the front opening 116 of the body 102 can protrude somewhat prominently in some configurations to allow an installer to easily identify the location of the clip 100 after drywall installation.

In different examples, the shape of the rear opening 114 and the front opening 116 can be in any shape or form. For example, the shape of the openings 114, 116 can be circular, square, rectangular, or triangular. In some examples, the shape of the openings 114, 116 can be same or different. In some examples, the size of the openings 114, 116 can be the same or different. As discussed herein, the "size" of the openings 114, 116 can be determined by identifying a cross-sectional area of the openings 114, 116. For example, the cross-sectional area of the funnel at the rear opening 114, transverse to the frontward/rearward directions, is larger than the cross-sectional area of the funnel at the front opening 116 and the rear opening 114 is thus larger than the front opening 116. In the illustrated example, the shape of the front opening 116 is circular with a diameter D1 (see FIG. 1). As shown in FIG. 2, the shape of the rear opening 114 is rectangular and is defined by a width W1 and a height H1. Generally, the rear opening 114 is wider or otherwise larger than the front opening 116. However, a lateral width of the rear opening 114 may be equal to or substantially equal to a width of the front opening 116 in some cases, with a height of the rear opening 114 being relatively large as compared to the front opening 116 (e.g., so as to extend above and below a corresponding support structure).

Figure 3:
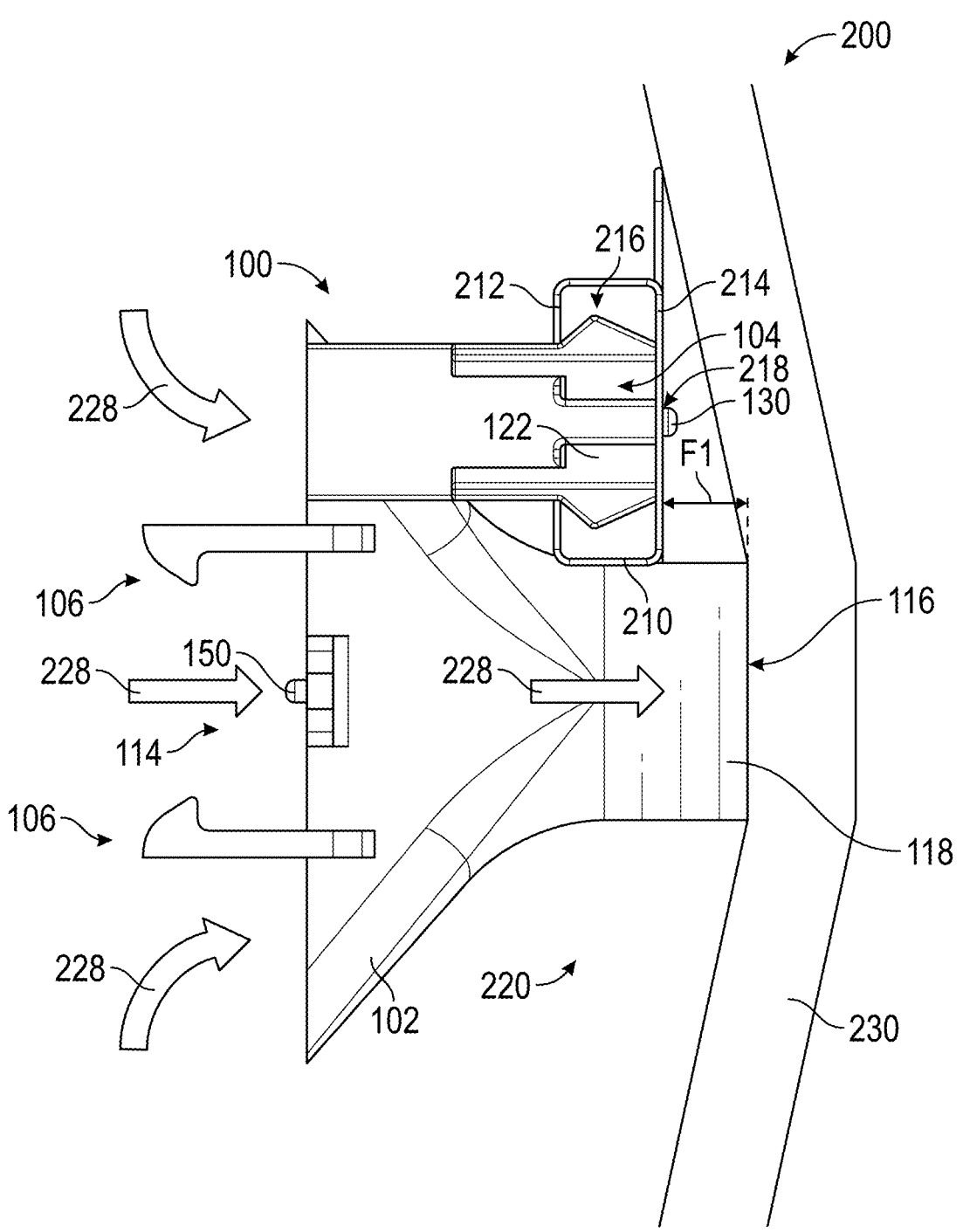
FIG. 3 is a left side elevation view of a support assembly, including the clip of FIG. 1 coupled in a rear-side orientation to a support bracket prior that is secured to drywall.
Figure 4:
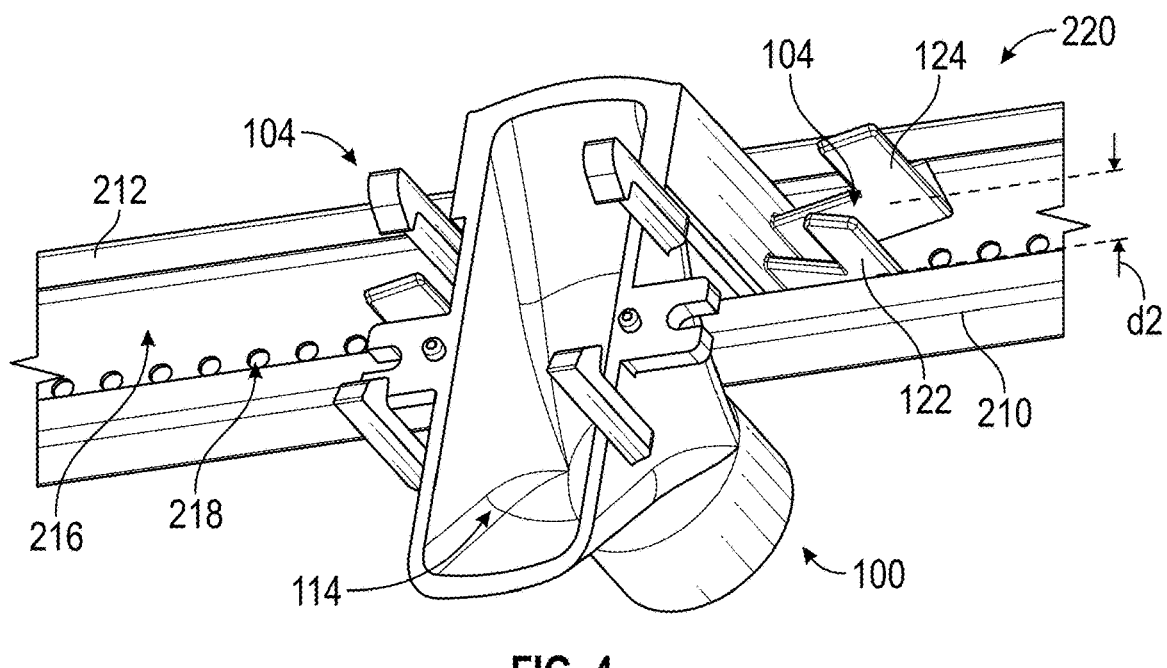
FIG. 4 is a rear, bottom axonometric view of the clip of FIG. 1 coupled to the support bracket by first clip arms in the rear-side orientation.
Figure 5:
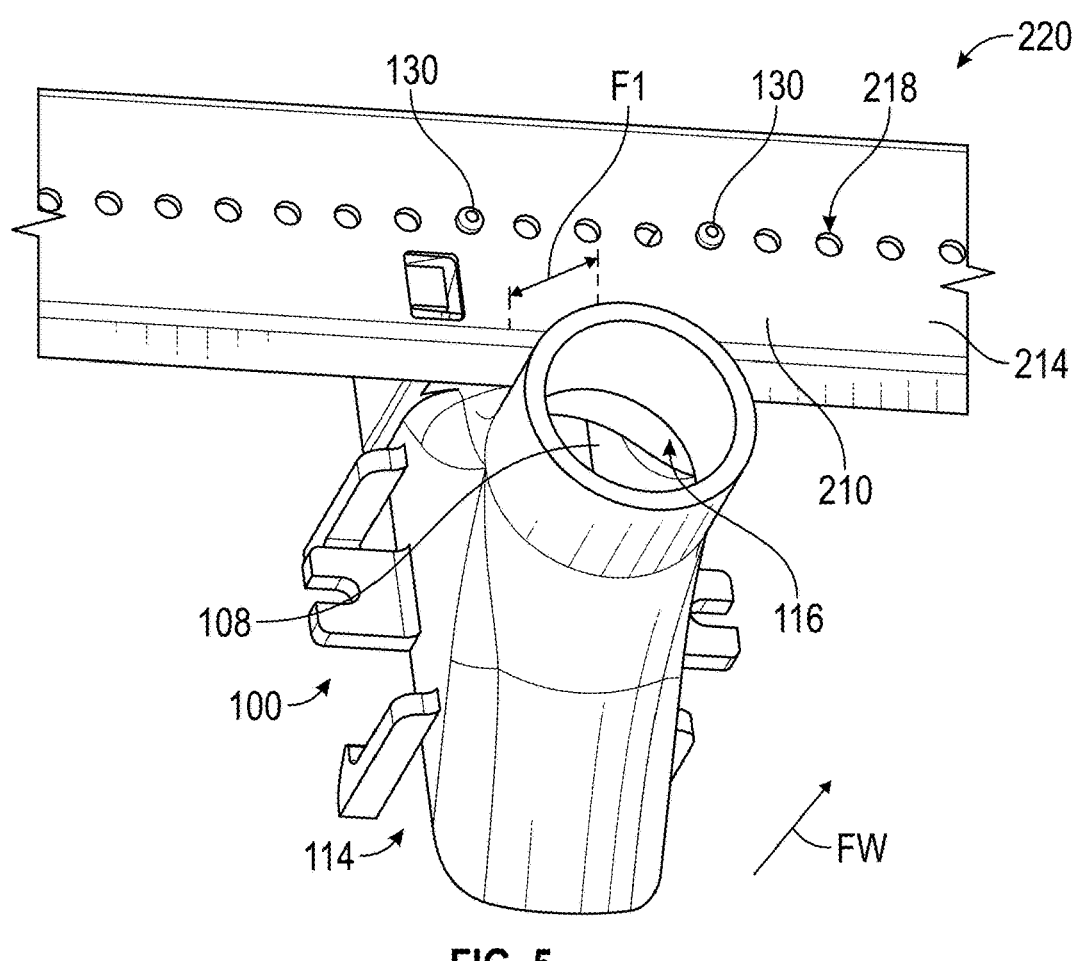
FIG. 5 a front, bottom axonometric view of the clip of FIG. 1 coupled to the support bracket by first clip arms in the rear-side orientation.

As illustrated in FIG. 1, in particular, first clip arms 104 collectively extend in a frontward direction FW, so as to be located to engage and secure the clip 100 to a support bracket in a rear-side orientation of the clip 100 (see FIGS. 3 through 5). In particular, the first clip arms 104 of FIG. 1 extends in a frontward direction FW relative to the rear opening 114 of the body 102. The first clip arms 104 include one or more set of angled arms 122 that extend transverse to the frontward direction FW (e.g., two sets of the arms 122, as shown). In some examples, the angled arms 122 may be angularly offset from each other by an offset angle OA1. In the illustrated example, the offset angle OA1 of the angled arms 122 is less than 90 degrees. The various angled arms 122 (e.g., of each of the one or more sets) have free ends 124 that are disposed opposite of the corresponding proximal ends 126. The proximal ends 126 can be connected to support arms 128 that extend integrally from a rear end 129 of the body 102 in a frontward direction FW. Thus, in particular, the first clip arms 104 can extend integrally in opposing directions from the support arms 128, transverse to the frontward direction FW.]

Further, the angled extension the clip arms 104 away from each other, as provided by the offset angle OA1, can allow the sets of clip arms 104 to be manually squeezed together to reduce a spacing therebetween and then to resiliently return toward the original configuration (upon release of the manual pressure) to secure the clip 100 to a support structure (e.g., as further discussed below).

In the illustrated example, the support arms 128 are spaced apart by a distance that is defined by the width W1 of the rear opening 114. Accordingly, the distance between the support arms 128 may be different based on the shape or size of the rear opening 114.

In different examples, a length L1 that the support arms 128 extend in the frontward direction FW to support the angled arms 122 may vary. In some examples, the length L1 of the support arms 128 can be shorter than a length L2 defined between the rear opening 114 and the front opening 116. Accordingly, for example, the angled arms 122 may be supported rearward of the front opening 116, so that the front opening 116 defines a forward-most point of the clip 100. Correspondingly, in the illustrated example, the funnel of the body 102 (e.g., as extends over the length L2 between the rear opening and the front opening) extends beyond the first clip arms 104 in the frontward direction FW. Alternatively, in some examples, the length of the support arms 128 can be longer than the length between the rear opening 114 and the front opening 116.

The first clip arms 104 may include a frontward protrusion 130 that is arranged between free ends 124 of the angled arms 122 relative to a direction transverse to the frontward direction FW (e.g., adjacent to or proud of the proximal end 126 of the support arms 128). As further discussed blow, the protrusions 130 can further help to locate and secure the clip 100 relative to a supporting bracket (not shown).

In some examples, the clip arms 104 can include protrusions or recesses that can help to secure the clip arms 104 to a bracket. For example, as also discussed below, the free ends 124 of the angled arms 122 in the illustrated example include angle profile locks 132 that extend in a direction transverse to the front direction FW and can correspondingly engage a support bracket during assembly. For example, the angle profile locks 132 can lock the clips arms 104 within a channel (not shown) of the support bracket. In some examples, the clip arms 104 can also (or alternatively) include grip features, e.g., rearwardly extending tabs 133 as in the illustrated example, that can allow an installer to easily pinch the sets of clip arms 104 together for installation or removal of the clip 100 relative to a support bracket. For example, the rearwardly extending tabs 133 can increase the surface area of the clip arms 104 that is in contact with the supporting bracket to enhance the gripping power between the clip arms 104 and the support brackets.

Figure 6:
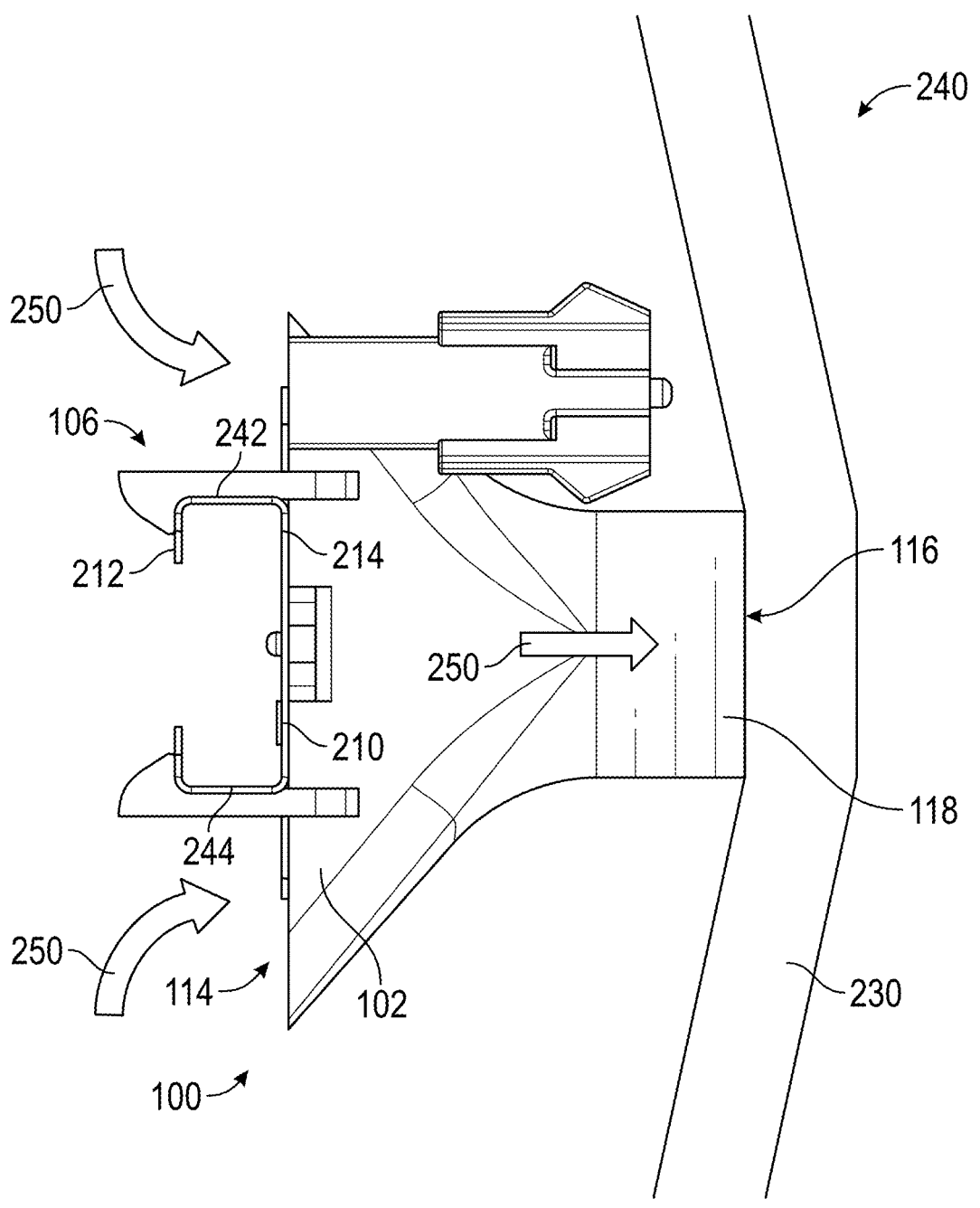
FIG. 6 is a left side elevation view of a support assembly, including the clip of FIG. 1 coupled in a front-side orientation to a support bracket prior that is secured to drywall.
Figure 7:
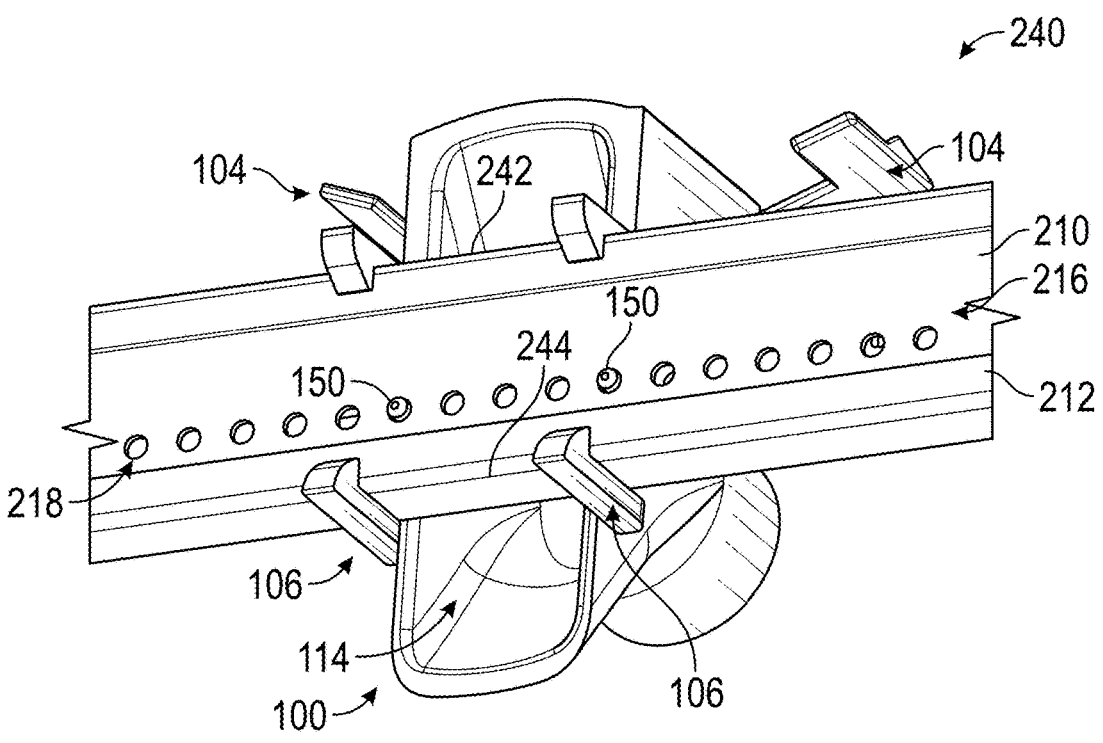
FIG. 7 is rear, bottom axonometric view of the clip of FIG. 1 coupled to the support bracket by second clip arms in the front-side orientation.
Figure 8:
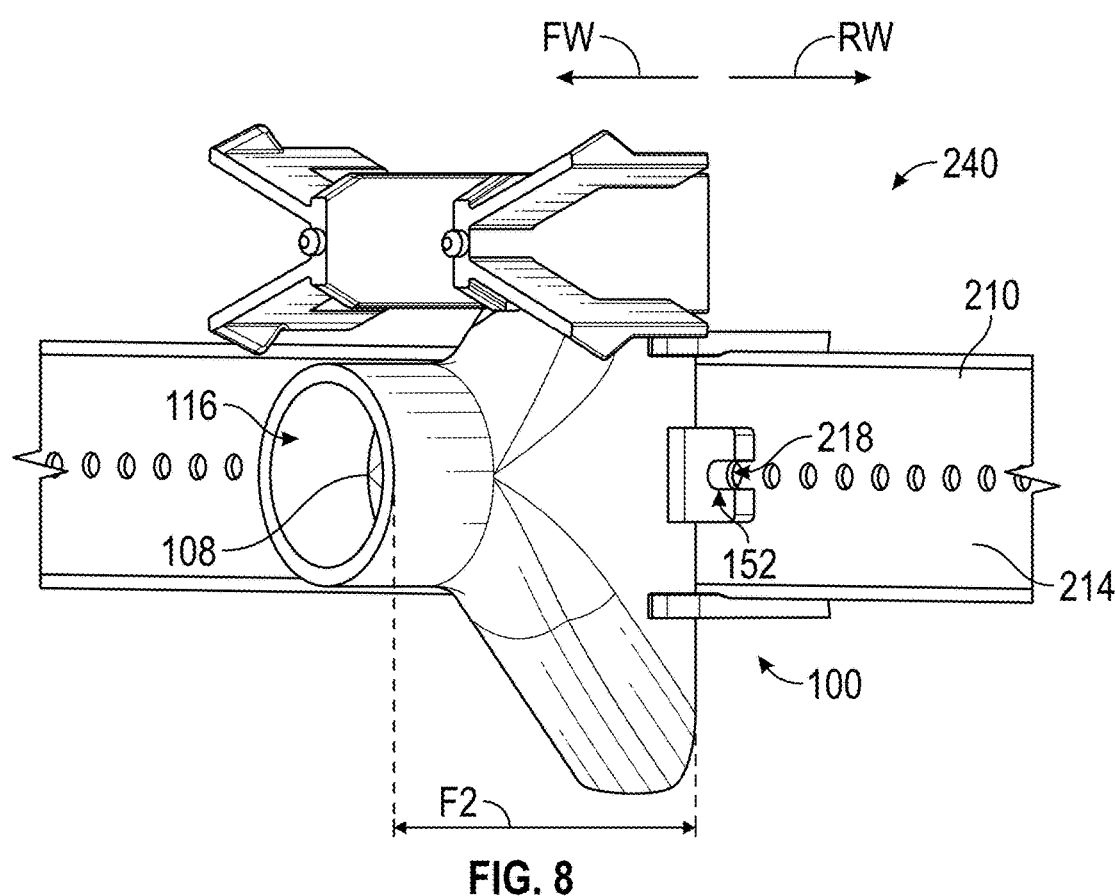
FIG. 8 is a front, bottom axonometric view of the clip of FIG. 1 coupled to the support bracket by second clip arms in the front-side orientation.

As illustrated in FIG. 2, in particular, second clip arms 106 extend in a rearward direction RW, so as to be located to engage and secure the clip 100 to a support bracket in a front-side orientation (see, e.g., FIGS. 6-8). More specifically, in the illustrated example, the second clip arms 106 extend integrally from the rear side 110 of the body 102 in the rearward direction RW. The second clip arms 106 can include a hook 142 that is disposed at free ends 144 of hooked arms 146 extending in the rearward direction RW beyond the rear opening 114, or various other features for engagement with a support bracket. Further, the second clip arms 106 are positioned such that the rear opening 114 extends beyond the second clip arms 106 in a direction transverse to the rearward direction RW. In other words, in the orientation shown in FIG. 2, the height H1 of the rear opening 114 is sufficiently large so that the rear opening 114 extends above and below the second clip arms 106.

In some examples, further protrusions or other features can be provided to help locate and secure the clip 100 in a rear-side orientation. For instance, in the illustrated examples, the body 102 include tabs 148 that extend integrally from the rear end of the body 102 in a perpendicular direction relative to the frontward direction FW. In other words, the tabs 148 are positioned between the two set of second clip arms 106 and extends in a direction transverse to a length L3 of the hooked arms 146. A rearward protrusion 150 arranged between free ends 144 of the second clip arms 106, relative to a direction transverse to the rearward direction RW. More specifically, the rearward protrusion 150 extends integrally from the tab 148 in a rearward direction RW in the illustrated example, although other protrusions can be otherwise oriented (e.g., can extend directly from the body 102 rather than from a tab). Further, each of the tabs 148 include a screw attachment hole 152 disposed along a side edge 154 of the tab 148.

FIGS. 3-8 illustrate different configurations of a support assembly 200 for in-wall wiring, including a support bracket 210 (e.g., telescoping screw gun bracket) and the clip 100 of FIGS. 1 and 2 to secure wiring in different orientations. In particular, the support bracket 210 includes a first (rear) side 212 and a second (front) side 214. The first side 212 includes a rear channel 216 and the second side 214 includes a plurality of openings 218 that are spaced equally apart. However, although a particular support bracket 210 is shown in FIGS. 3-8, other examples can include otherwise configured brackets (e.g., non-telescoping brackets that also include rear channels or other similar structures, brackets without the openings 218, or brackets with different or no channels).

As also described above, the installation of wiring on the support bracket 210 can include securing the support bracket 210 to extend between studs or other building structures (e.g., frame). Once the support bracket 210 is secured between studs (or beforehand), the clip 100 can be selectively secured to the support bracket 210 at a particular lateral location along the bracket 210 and with the clip 100 in one of multiple orientations. In particular, the clip 100 can be secured to the support bracket 210 either by the first clip arms 104, in a rear-side orientation of the clip 100, or by the second clip arms 106, in a front-side orientation of the clip 100. In some examples, with the clip 100 secured to the support bracket 210 and prior to installation of drywall over the support bracket 210 and the clip 100, one or more wires may be extended through the internal funnel 108.

Referring to FIG. 3, an example rear-side orientation 220 is shown. In the rear-side orientation 220, the first clip arms 104 of the clip 100 are used to engage with the first side 212 of the support bracket 210. More specifically, the first clip arms 104 can be snapped in place within the rear channel 216 of the support bracket 210 to create a secure coupling with the support bracket 210. For example, as generally discussed above, a user can squeeze together the clip arms 104 of the two sets to seat the clip arms 104 into the channel 216, and then the clip arms 104 can be released to resiliently separate from each other and thereby engage walls of the channel 216.

More particularly, in a rest position (see FIG. 1), prior to being secured within the rear channel 216 of the support bracket 210, the free ends of the angled arms 122 of the first clip arms 104 are spaced by a first distance d1 for engagement with the support bracket 210. In an engaged position (see FIGS. 3-5), the angled arms 122 of the first clip arms 104 are then secured within the rear channels 216, with the angled arms 122 are deformed resiliently to space the free ends 124 by a second distance d2 (see FIG. 4) that is smaller than the first distance d1. In other words, sets of the first clip arms 104 are resiliently deformed toward each other for installation into the rear channel 216 of the support bracket 210 and then resiliently return toward a rest position to securely engage the clip 100 to the support bracket 210.

As described above, one or more wires may extend through the clip 100, from the rear opening 114 to the front opening 116, in order to secure the one or more wires to the support bracket 210. For example, the one or more wires can be selectively installed through any point of the rear opening 114 (e.g., as depicted by block arrows in FIG. 3). The wires can then be pushed (or pulled) through the clip 100, as guided by the internal funnel 108 (see, e.g., FIG. 2) so that the wires extend out of the front opening 116. In other words, wires can be guided from the rear opening 114 toward the front opening 116 as illustrated by the block arrows 228.

In some examples, as described above, the installer can either mark a hole in a section of drywall 230 to pre-cut a hole before installation (e.g., using a cookie-cutter or other drill) or can cut a hole in a drywall 230 after installation to align with the elongated duct 118 or the front opening 116 of the body 102 after first locating the clip 100 based on the bulge in the drywall 230 and cut around it after the drywall 230 is mounted to the stud. As such, in the rear-side orientation 220, the clip 100 is generally configured to provide a positive displacement relative to installed drywall. The positive displacement allows the clip 100 to stick out proud of the support bracket 210 within the wall cavity defined between the studs (as shown in FIG. 3, in particular). In this regard, as generally discussed above, the length L2 of the clip 100 relative to the length L1 of the support arms 128 can provide a particular extension of the front opening 116 forward of the bracket 210 that corresponds to positive engagement with the drywall 230 for a given range of installation depths of the bracket 210.

Still referring to FIGS. 3-5, the clip 100 is disposed in a rear-side of the support bracket 210 and the rear opening 114 is fully exposed behind the support bracket 210 to provide a larger area to receive wiring. Further, the internal funnel 108 of the clip 100 extends past the support bracket 210 in a frontward direction FW such that the front opening 116 of the internal funnel 108 is located frontward FW of the support bracket 210. In particular, the front opening 116 can be located at a first distance F1 from the front of the support bracket 210 corresponding to appropriate positive engagement with the drywall 230 (or other desired orientation).

With the clip 100 installed, as shown in FIGS. 3 and 5 in particular, the frontward protrusions 130 engage corresponding openings of the plurality of openings 218 in the support brackets 210 with the clip 100 in the rear-side orientation 220. In other words, the frontward protrusions 130 are inserted through the rear channel 216 of the support bracket 210 in the frontward direction FW to engage the corresponding openings 218. The frontward protrusions 130 can thus prevent the clip 100 from sliding laterally (e.g., left or right) along the support bracket 210, and the clip arms 104 and the protrusions 130 can cooperatively ensure that the clip 100 remains in an overall fixed position relative to the support bracket 210.

Alternatively, referring to FIG. 6, the clip 100 can be secured in a front-side orientation 240. In the front-side orientation 240, the clip body 102 is seated against the second side 214 of the support bracket 210, and the second clip arms 106 of the clip 100 snap into engagement with the first side 212 of the support bracket 210. In this orientation, similar to FIG. 3, one or more wires may be selectively installed through the rear opening 114 from either of a top side 242 or a bottom side 244 of the support bracket 210 and guided thereby from the rear opening 114 to the front opening 116 as illustrated by arrows 250.

In some examples, as described above, the installer can either pre-cut (e.g., drill) a hole in a drywall 230 to align with the elongated duct 118 or the front opening 116 of the body 102 or can locate the clip 100 based on the bulge in the drywall 230 and cut the drywall 230 accordingly after the drywall 230 is mounted to the stud. Correspondingly, in the front-side orientation 240, the clip 100 is generally configured to provide a positive displacement relative to installed drywall (e.g., extending into the drywall to create a bulge). In this regard, as also generally discussed above, the length L2 of the clip 100 can provide a particular extension of the front opening 116 forward of the bracket 210 that corresponds to positive engagement with the drywall for a given range of installation depths of the bracket 210. Notably, however, the positive displacement in the front-side orientation 240 is larger than the positive displacement in the rear-side orientation 220. Accordingly, in the front-side orientation 240, as opposed to the rear-side orientation 220, the clip 100 can provide positive displacement of the drywall 230 with the drywall 230 spaced farther away from the support bracket 210 (i.e., with the support bracket 210 installed at a larger depth behind the drywall 230).

Referring to FIG. 7, in contrast to the rear-side orientation 220, in which the first clip arms 104 are secured within the rear channel 216 of the support bracket 210, the front-side orientation 240 utilizes the second clip arms 106 to surround (i.e., wrap around) the support bracket 210. More specifically, the second clip arms 106 of the clip 100 are secured around the support bracket 210, with the clip arms 106 being resiliently deformable to snap around a top side 242 and a bottom side 244 of the support bracket 210 to engage hooks of the clip arms 106 with the first side 212 of the support bracket 210. Further, similarly to the forward protrusions 130 (see, e.g., FIGS. 3 and 5), the rearward protrusions 150 are configured to engage with corresponding openings of the plurality of openings 218 in the support brackets 210 with the clip 100 in the front-side orientation 240. In other words, the rearward protrusions 150 are inserted along the second side 214 of the support bracket 210 in the rearward direction RW to prevent the clip 100 from sliding laterally (e.g., left or right) along the support bracket 210.

Referring to FIG. 8, with the clip 100 secured on the second side 214 of the support bracket 210, the rear opening 114 extends beyond the support bracket 210 in opposing directions transverse to the frontward direction FW (e.g., above and below the bracket 210, as shown). Further, the internal funnel 108 extends from the support bracket 210 in the frontward direction FW such that the front opening 116 of the internal funnel 108 is located frontward FW of the support bracket 210 and the front opening 116 is located at a second distance F2 from the front of the support bracket 210 that is larger than the first distance F1 (e.g., and also equal to the length L2 shown in FIG. 1). In some examples, the screw attachment hole 152 of the tabs 148 can be concentrically aligned with the openings 218. In some examples, a fastening mechanism (e.g., a pin) can be inserted through the screw attachment hole 152 and the opening 218 to establish a secured connection between the support bracket 210 and the clip 100.

Thus, clips and related systems according to the disclosure can provide improved approaches for securing wiring (or other components) relative to building structures, In particular, some examples can be selectively installed in different orientations to provide different lengths of extension forward of a support bracket and, correspondingly, to ensure positive engagement with drywall at various depths of installation of the support bracket. As such, for example, installers can ensure not only that wiring (or other components) are securely held at a desired position within a stud cavity, but also that the location of the wiring can be relatively easily identified before or after installation of drywall.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

As used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise limited or defined, "integral" and derivatives thereof (e.g., "integrally") describe elements that are manufactured as a single piece without fasteners, adhesive, or the like to secure separate components together. For example, an element stamped or cast as a single-piece component from a single piece of sheet metal or a single mold (etc.), without rivets, screws, or adhesive to hold separately formed pieces together, is an integral (and integrally formed) element. In contrast, an element formed from multiple pieces that are separately formed initially, then later connected together, is not an integral (or integrally formed) element.

Also as used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

Unless otherwise specified or limited, the terms "about" and "approximately", as used herein with respect to a reference value, refer to variations from the reference value of ±20% or less (e.g., ±15, ±10%, ±5%, etc.), inclusive of the endpoints of the range. Similarly, as used herein with respect to a reference value, the term "substantially equal" (and the like) refers to variations from the reference value of less than ±5% (e.g., ±2%, ±1%, ±0.5%) inclusive. Where specified in particular, "substantially" can indicate a variation in one numerical direction relative to a reference value. For example, the term "substantially less" than a reference value (and the like) indicates a value that is reduced from the reference value by 30% or more (e.g., 35%, 40%, 50%, 65%, 80%), and the term "substantially more" than a reference value (and the like) indicates a value that is increased from the reference value by 30% or more (e.g., 35%, 40%, 50%, 65%, 80%).

In some implementations, devices or systems disclosed herein can be utilized, manufactured, installed, etc. using methods embodying aspects of the disclosed technology. Correspondingly, unless otherwise indicated, any description herein of particular features, capabilities, or intended purposes of a device or system should be considered to disclose, as examples of the disclosed technology a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated, discussion herein of any method of manufacturing or using for a particular device or system, including installing the device or system, should be understood to disclose, as examples of the disclosed technology, the utilized features and implemented capabilities of such device or system.

Some methods of the disclosed technology may be presented above or below with operations listed in a particular order. Unless otherwise required or specified, the operations of such methods can be implemented in different orders, in parallel, or as selected sub-sets of one or more individual operations (e.g., with a particular listed operation being implemented alone, rather than in combination with others).

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A support assembly for in-wall wiring, the support assembly comprising:
a support bracket that extends between building structures; and
a clip that includes:
an internal funnel with a front opening and a rear opening, the rear opening being larger than the front opening; and
clip arms securable to the support bracket to support the clip to receive wire through the internal funnel, from the rear opening to the front opening, with the clip in selectively either of:

a rear-side orientation, in which the clip arms secure the clip on a rear side of the support bracket with the internal funnel extending to support the front opening forward of the support bracket; or
a front-side orientation, in which the clip arms secure the clip on a front side of the support bracket with the internal funnel extending from the support bracket in a frontward direction to the front opening.

2. The support assembly of claim 1, wherein in the rear-side orientation, the front opening is located at a first distance forward of the front of the support bracket; and
wherein, in the front-side orientation, the front opening is located at a second distance forward of the front of the support bracket that is larger than the first distance.

3. The support assembly of claim 1, wherein the clip arms include first clip arms extending in a frontward direction into a rear channel on the support bracket to secure the clip in the rear-side orientation.

4. The support assembly of claim 3, wherein the first clip arms include one or more sets of angled arms that extend transverse to the frontward direction and are resiliently deformable to engage the rear channel on the support bracket.

5. The support assembly of claim 1, wherein the clip arms include second clip arms extending in a rearward direction around the support bracket to secure the clip in the front-side orientation.

6. The support assembly of claim 5, wherein the second clip arms include hooked arms extending in the rearward direction beyond the rear opening to engage the support bracket.

7. The support assembly of claim 1, wherein, with the clip in either of the rear-side or front-side orientations, the rear opening extends beyond the support bracket in opposing directions transverse to the frontward direction.

8. The support assembly of claim 1, wherein the clip further includes locating protrusions that engage corresponding openings in the support bracket with the clip in either of the rear-side or the front-side orientations.

9. A clip to secure wiring to a support bracket, the clip comprising:
a body that defines an internal funnel extending between a rear opening at a rear side of the body and a front opening at a front side of the body, the rear opening being wider than the front opening;
first clip arms extending in a frontward direction and configured to engage the support bracket to secure the clip at a first side of the support bracket; and
second clip arms extending in a rearward direction and configured to engage the support bracket to secure the clip at a second side of the support bracket.

10. The clip of claim 9, wherein the second clip arms include hooked arms extending in the rearward direction beyond the rear opening.

11. The clip of claim 9, wherein the rear opening extends beyond the second clip arms in a direction transverse to the rearward direction.

12. The clip of claim 9, wherein the first clip arms include one or more sets of angled arms that extend transverse to the frontward direction; and
wherein the angled arms of each of the one or more sets:
have free ends that are spaced by a first distance in a rest position for engagement with the support bracket; and
are resiliently deformable to space the free ends by a second distance smaller than the first distance for installation onto the support bracket.

13. The clip of claim 9, wherein the internal funnel extends beyond the first clip arms in the frontward direction.

14. The clip of claim 9, wherein rear opening is wider than the front opening along a height direction that is transverse to the frontward direction; and wherein the first clip arms are offset from the front opening along the height direction.

15. The clip of claim 9, further comprising locating protrusions to locate the clip relative to apertures on the support bracket.

16. The clip of claim 15, wherein the locating protrusions include:

one or more frontward protrusions arranged between free ends of the first clip arms, relative to a direction transverse to the frontward direction, to locate the clip on the support bracket; or one or more rearward protrusions arranged between free ends of the second clip arms, relative to a direction transverse to the rearward direction, to locate the clip on the support bracket.

17. A method of installing wiring on a support bracket, the method comprising:

securing the support bracket to extend between studs or other building structures;

selectively securing a clip to the support bracket in either of:

a rear-side orientation, in which an internal funnel of the clip extends from a rear opening behind the support bracket, past the support bracket in a frontward direction, so that a front opening of the internal funnel that is smaller than the rear opening is located frontward of the support bracket; or a front-side orientation, in which the internal funnel extends forward of the support bracket in the frontward direction, from the rear opening to the front opening; and prior to installation of drywall over the support bracket and clip, extending one or more wires through the internal funnel, from a rear opening to the front opening, to support the one or more wires with the support bracket.

18. The method of claim 17, wherein, in the rear-side orientation, first clip arms of the clip are secured within a rear channel of the support bracket.

19. The method of claim 17, wherein, in the front-side orientation, second clip arms of the clip are secured around the support bracket, extending over a top side and under a bottom side of the support bracket.

20. The method of claim 17, wherein the one or more wires are selectively installed through the rear opening from either of a top side or a bottom side of the support bracket.

* * * * *